US010072758B2

(12) United States Patent
Getto et al.

(10) Patent No.: US 10,072,758 B2
(45) Date of Patent: Sep. 11, 2018

(54) STUFFING BOX BODY WITH INTEGRAL DIVERTED LANTERN RING (71) Applicant: SEAL RYT CORPORATION, Westfield, MA (US)

(72) Inventors: Andrew J. Getto, Agawam, MA (US); Michael F. Huard, Easthampton, MA (US)

(73) Assignee: SEAL RYT CORPORATION, Westfield, MA (US)

( * ) Notice: Subject to any disclaimer, the term of this patent is extended or adjusted under 35 U.S.C. 154(b) by 85 days.

(21) Appl. No.: 14/935,897

(22) Filed: Nov. 9, 2015

(65) Prior Publication Data
US 2017/0130729 A1  May 11, 2017

(51) Int. Cl.
*F16J 15/18* (2006.01)
*F16C 33/74* (2006.01)
*F04D 29/10* (2006.01)
*F16J 15/40* (2006.01)

(52) U.S. Cl.
CPC ............ *F16J 15/183* (2013.01); *F04D 29/10* (2013.01); *F16C 33/74* (2013.01); *F16J 15/40* (2013.01); *F04D 29/108* (2013.01); *F16J 15/182* (2013.01); *F16J 15/406* (2013.01)

(58) Field of Classification Search
CPC ...... F16J 15/182; F16J 15/183; F04D 29/106; F04D 29/108; F04B 53/164; F16C 33/74
See application file for complete search history.

(56) References Cited

U.S. PATENT DOCUMENTS

| 1,829,206 | A | * | 10/1931 | Wilson | F16J 15/183 |
| | | | | | 277/516 |
| 2,321,927 | A | | 6/1943 | McCoy et al. | |
| 3,646,846 | A | | 3/1972 | Houghton et al. | |
| 4,229,011 | A | * | 10/1980 | Wikelski | F04B 39/041 |
| | | | | | 277/432 |
| 4,298,207 | A | | 11/1981 | Hopper et al. | |
| 4,301,893 | A | | 11/1981 | St. Jean et al. | |

(Continued)

FOREIGN PATENT DOCUMENTS

| DE | 3028537 A1 | 2/1981 | | |
| GB | 191311868 A | * | 5/1914 | ............. F16J 15/183 |
| GB | 2056588 A | * | 3/1981 | ............. F16J 15/183 |

*Primary Examiner* — Nicholas L Foster
(74) *Attorney, Agent, or Firm* — Michael I. Wolfson; William H. Dippert (57) ABSTRACT

A bearing with an integral diverted lantern ring for installation into the seal cavity of a rotary mechanical device to provide a bearing surface and allow for flush fluid to engage the shaft closer to the motor end is provided. The bearing eliminates whip in a rotating shaft and is split to allow easy installation over an installed shaft. The bearing is substantially cylindrical with an inner bore closely approximating the outer diameter of the shaft. The diverted lantern ring includes an outer groove at the impeller end on the outer surface at a flush port and a groove on the inner surface at a location closer to the motor end. Flush fluid channels are provided between the outer groove and inner groove of the bearing. The purpose is to redirect the external flush from the impeller end on the OD to the motor end on the ID, thus repositioning the flush deposit on the sleeve, under the bearing. This allows the throttling characteristic of the close clearance bearing surface to increase.

19 Claims, 6 Drawing Sheets

(56) References Cited

U.S. PATENT DOCUMENTS

| | | | | |
|---|---|---|---|---|
| 4,351,531 A | * | 9/1982 | Maasberg | F04B 53/164 277/516 |
| 4,371,180 A | | 2/1983 | Case et al. | |
| 4,431,698 A | | 2/1984 | Case et al. | |
| 4,494,760 A | * | 1/1985 | Spargo | B63H 23/321 277/580 |
| 4,559,862 A | | 12/1985 | Case et al. | |
| 5,370,926 A | | 12/1994 | Hopper | |
| 5,979,483 A | * | 11/1999 | Zapalac | F16K 41/003 137/15.01 |
| 6,834,862 B2 | | 12/2004 | Wilkinson | |
| 8,814,432 B2 | | 8/2014 | Thoma et al. | |
| 9,206,903 B2 | | 12/2015 | Huard et al. | |
| 9,347,488 B2 | | 5/2016 | Thoma et al. | |
| 2003/0026718 A1 | | 2/2003 | Dziver et al. | |
| 2003/0107183 A1 | | 6/2003 | Wilkinson | |
| 2009/0045589 A1 | * | 2/2009 | Patton | F16J 15/183 277/516 |

\* cited by examiner

STUFFING BOX BODY WITH INTEGRAL DIVERTED LANTERN RING

BACKGROUND OF THE INVENTION

This invention relates to an improved bearing with an integral lantern ring for a rotary mechanical device and, more particularly, to an improved bearing with the lantern ring having offset outer and inner flush holes.

Rotary mechanical devices, such as mixers and centrifugal pumps, include an impeller mounted on a shaft which is driven by an electrical motor. The shaft passes through a seal cavity or a stuffing box defined by a cylindrical cavity in the device housing. The shaft is supported by bearings at the motor end, and seals are placed in the stuffing box to engage the shaft to prevent fluid from passing through the seal cavity and reaching the bearing and the motor, causing damage to both.

In mechanical pumps, chemical fluids or solvents being pumped, many of which are corrosive, enter the seal cavity. Accordingly, it is important that appropriate packing material is placed within the seal cavity. In addition, fluid such as seal water is pumped into the seal cavity through a flush port to prevent the fluid being pumped or mixed from travelling along the shaft to the bearings and motor and to provide lubricant to the packing. Over extended use, the pump shaft may develop a whip as the bearings wear. Thus, it is highly desirable to provide a sealing system that provides an effective seal and an additional bearing surface to reduce the whip that can occur as the shaft rotates, thus controlling the amount of seal fluid entering an outer lantern ring groove in the seal cavity.

While there are a wide variety of devices available for use in providing sealing in a seal cavity, it is desirable to provide a improved bearing and sealing system providing an additional bearing surface for the impeller end of the shaft and causing a reduction in the pumped or mixed fluid entering the seal cavity to be countered by the seal fluid and packing to provide advantages over available devices.

SUMMARY AND OBJECTS OF THE INVENTION

Generally speaking, in accordance with the invention, an improved bearing with an integral diverted lantern ring for a rotary mechanical device is provided. The bearing is a substantially rigid member with an outer lantern ring groove at one location along the bearing axis and an inner lantern ring groove at another location along the bearing axis, with channels in the bearing wall to direct seal fluid onto the shaft from the inner lantern ring groove. The inner bore of the bearing provides a bearing surface for eliminating whip in the device shaft. The bearing is split to provide easy installation over an installed device shaft.

The bearing prepared in accordance with the invention is substantially rigid and is typically manufactured of a non-ferrous metal or thermoplastic material for providing an improved bearing surface and resistance to industrial solutions. The inner bore of the bearing closely approximates the outer diameter of the pump shaft. The external surface of the bearing includes a groove for receiving seal fluid with channels to an inner groove to form an internal lantern ring. Typically, the outer lantern ring groove is located at a flush inlet port near the impeller end of the stuffing box, and the diverted flow exits the lantern ring at the inner groove closer to the motor end. Generally, two or more packing rings are added on the motor side of the bearing to complete the installation.

Accordingly, it is an object of the invention to provide an improved bearing with an integral lantern ring to be inserted into a seal cavity of a rotary mechanical device.

Another object of the invention is to provide an improved bearing with an integral lantern ring with an outer grove at one location along the length of the bearing and an inner or internal groove connected thereto at another location along the length of the bearing.

Still another object of the invention is to provide an improved bearing for a rotary mechanical device having an integral lantern ring and a bearing outer O-ring for improved isolation of the product being handled by the rotary device.

Yet another object of the invention is an improved bearing with an integral diverted lantern ring for use with complementary flexible packing rings for use in a shaft sealing system to be inserted into the seal cavity of rotary mechanical devices.

A further object of the invention is to provide a bearing with an integral lantern ring with an outer lantern ring groove and holes closer to the impeller end of the seal cavity and an inner lantern ring groove and holes closer to the motor end of the seal cavity.

Still other objects and advantages of the invention will in part be obvious and will in part be apparent from the specification and claims.

The invention comprises a product possessing the features, properties, and the relation of components which will be exemplified in the product hereinafter described and the scope of the invention will be indicated in the claims.

BRIEF DESCRIPTION OF THE DRAWINGS

For a fuller understanding of the invention, reference is made to the following description taken in connection with the accompanying drawings, in which.

DESCRIPTION OF THE PREFERRED EMBODIMENTS

Figure 1:
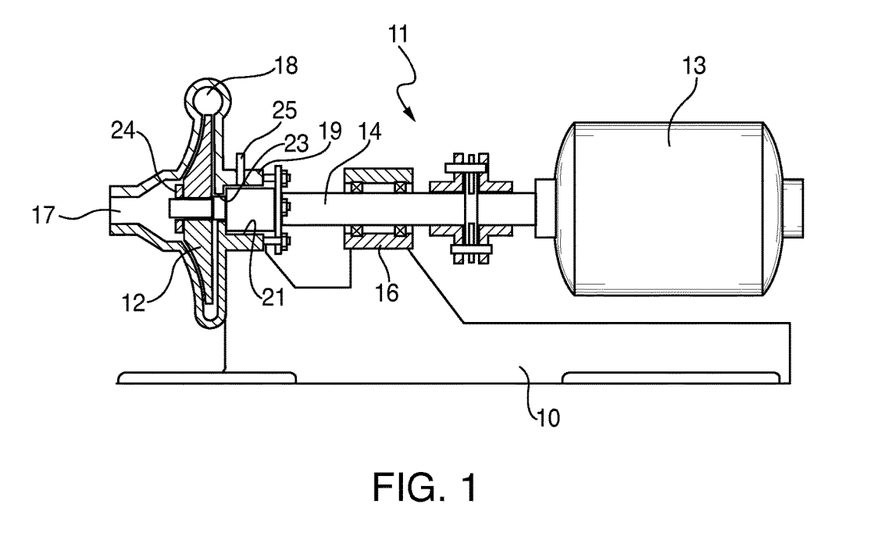
FIG. 1 is a partial cross-sectional view of a typical rotary fluid pump with a bearing in accordance with the invention installed in the seal cavity.

FIG. 1 illustrates a generic form of a centrifugal pump 11 in cross-section mounted on a frame 10. Pump 11 includes a centrifugal impeller 12 driven by an electric motor 13 that drives a rotary shaft 14 coupled to impeller 12. Shaft 14 is supported by a bearing housing 16 and rotates to draw fluid in through an impeller inlet 17 and expel the fluid out through a radial impeller outlet 18.

Figure 2:
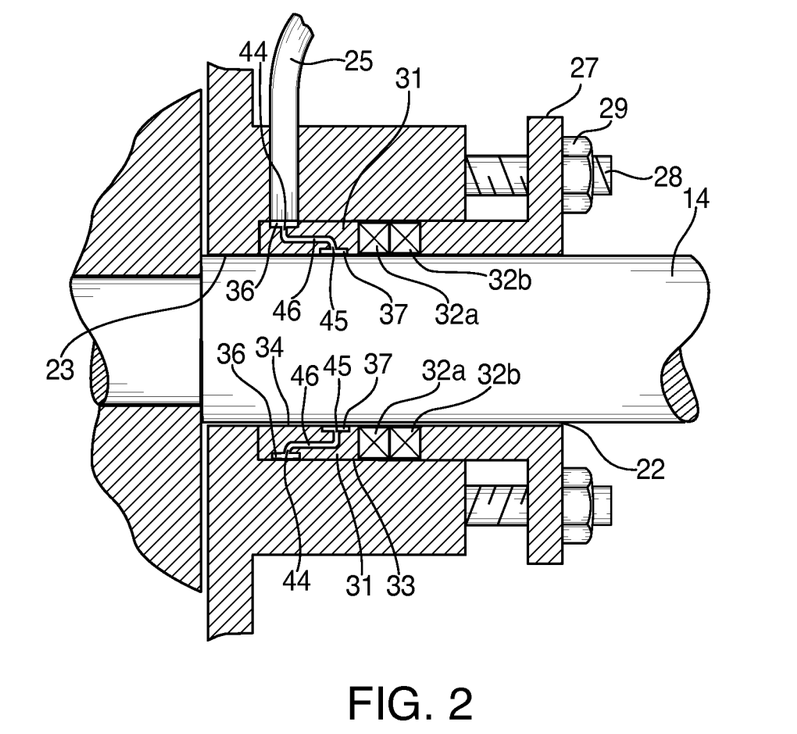
FIG. 2 is an enlarged cross-sectional view of the seal cavity of the pump showing a bearing with diverted lantern ring sealing system in accordance with the invention in place in the seal cavity.

Pump 11 includes a housing 19 having an inner bore 21 that defines a seal cavity or stuffing box 22 with shaft 14 passing therethrough as shown in detail in FIG. 2. Housing 19 includes an impeller opening 23 through which shaft 14 passes to engage impeller 12 and also includes a flush port 25 at the impeller end of stuffing box 22 for introduction of a flush fluid into stuffing box 22. Shaft 14 is coupled to impeller 12 by a nut or fastener 24 at the end portion of shaft 14 projecting through impeller 12.

Pump 11 operates by drawing a fluid to be pumped into inlet 17. During pumping, fluid tends to migrate and be forced into seal cavity 22 through opening 23. A wide variety of seals and venting configurations are available to be placed in seal cavity 22 abutting opening 23 in order to restrict and limit entry of pumped fluid into seal cavity 22. If fluid enters seal cavity 22 and migrates to bearings 32a, 32b, bearings 32a, 32b will be subject to substantial degradation due to the corrosive action of the pumped fluid.

FIG. 2 is an enlarged view of seal cavity 22 with a bearing with diverted lantern ring 31 in accordance with the invention in place. The motor end of seal cavity 22 is defined by a gland follower 27 mounted on gland bolts 28 and secured in place by gland nuts 29.

As shown in FIG. 2, bearing 31 constructed and arranged in accordance with the invention is positioned against the impeller end of seal cavity 22. A pair of compressible sealing rings 32a, 32b are positioned on the motor side of bearing 31. These elements are secured within seal cavity 22 by gland follower 27. Examples of various types of packing rings suitable for use herein are shown in U.S. Pat. No. 5,370,926, U.S. Pat. No. 4,559,862, U.S. Pat. No. 4,431,698, U.S. Pat. No. 4,371,180, and U.S. Pat. No. 4,298,207, the contents of which are incorporated herein by reference.

Figure 3:
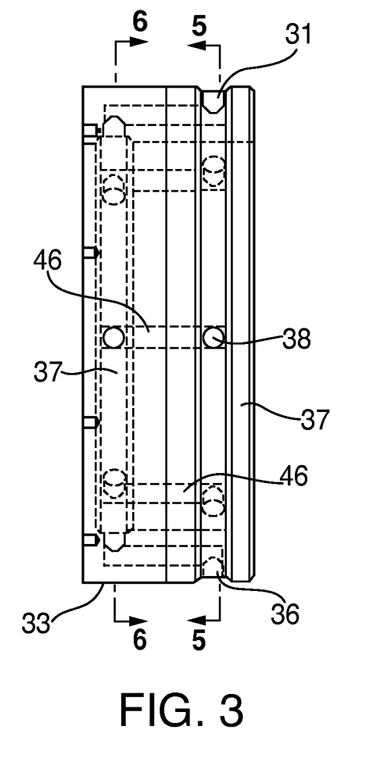
FIG. 3 is a side elevational view of the bearing with diverted lantern ring of FIG. 2 prepared in accordance with the invention.
Figure 4:
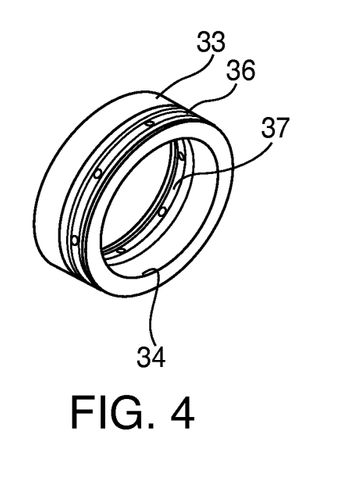
FIG. 4 is a perspective view of the bearing of FIG. 3.

In FIG. 3, bearing 31 is shown in a side elevational view. Bearing 31 is custom made for a particular shaft and pump. Bearing 31 is shown in perspective in FIG. 4.

Bearing 31 is a substantially cylindrical rigid member with an outer surface 33 and with an inner bore 34 closely dimensioned to the outer dimension of pump shaft 14 and fits within inner bore 21 of pump housing 19. Outer surface 33 of bearing 31 is formed with an outer flush fluid groove 36 at the impeller end at the location of flush port 25. Inner bore 34 of bearing 31 provides a bearing surface for shaft 14 when in position as shown in FIG. 2, and this is custom dimensioned for a particular mechanical device.

Bearing 31 is also formed with an inner flush fluid groove 37 formed in a location closer to the motor end to create a diverted lantern ring. Inner seal fluid groove 37 is formed in a position not adjacent to, that is, not aligned with, the location of outer flush fluid groove 36. A plurality of flush fluid holes 38 formed in outer bearing flush fluid groove 36 are in fluid communication with flush fluid holes 45 in inner groove 37 through channels 46.

In the embodiment illustrated in FIGS. 1-3, outer lantern ring groove 36 is closer to the motor end of stuffing box 22. The purpose of providing the diverted lantern ring with holes 45 closer to the motor end is to redirect the external flush from outer groove 36 to inner groove 37 at the motor end. This increases the throttling characteristic of the close clearance of the bearing surface to the shaft.

Figure 5:
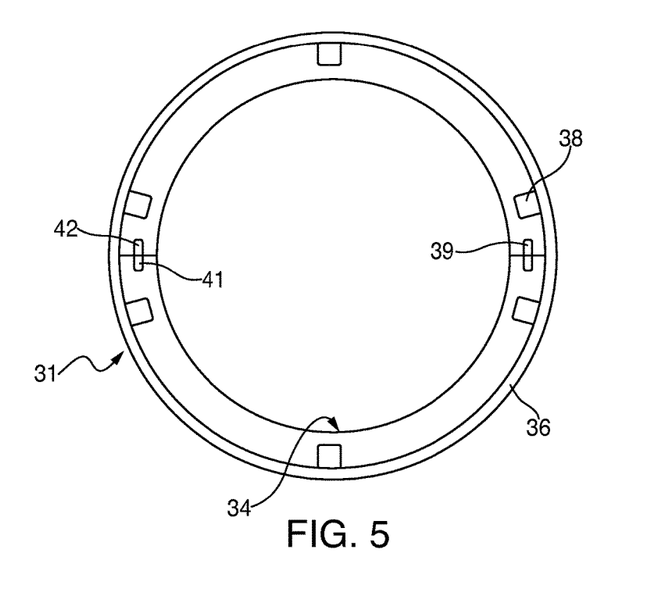
FIG. 5 is a cross-sectional view along the line 5-5 in FIG. 3.
Figure 6:
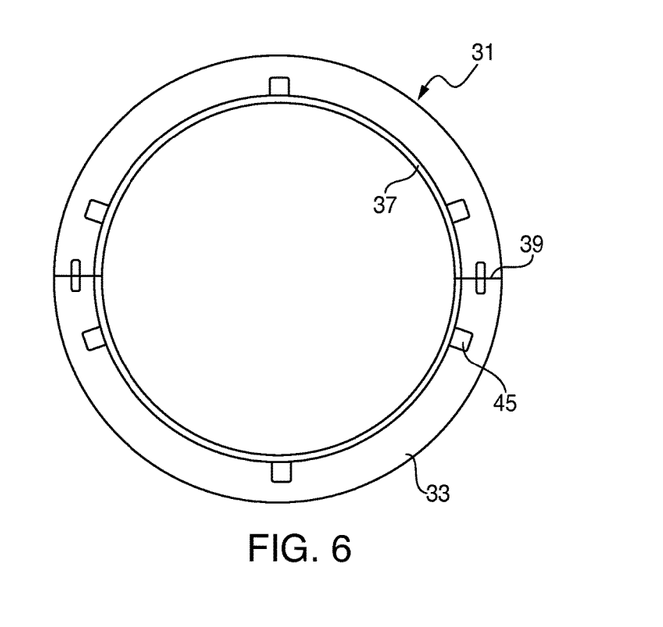
FIG. 6 is a cross-sectional view along the line 6-6 in FIG. 3.

In order to place bearing 31 in position in seal cavity 22, bearing 31 is split along a centerline 39, as shown in FIGS. 5 and 6. Splitting bearing 31 along a diameter allows bearing 31 to be placed about installed shaft 14 and pushed into position at the impeller end of seal cavity 22. Generally, at least one or two packing rings 32a, 32b are positioned on the gland side of bearing 31.

Bearing 31 split along center line 39 includes a pair of corresponding holes 41 on both halves of split bearing 31 for receiving mounting pins 42 for realignment and reassembly thereof. In this construction, pins 42 insure that when bearing 31 is secured about shaft 14, outer flush fluid groove 36 and inner groove 37 are properly aligned on both sections. Outer flush fluid groove 36 is positioned to align with flush port 25 formed in housing 19.

Figure 7:
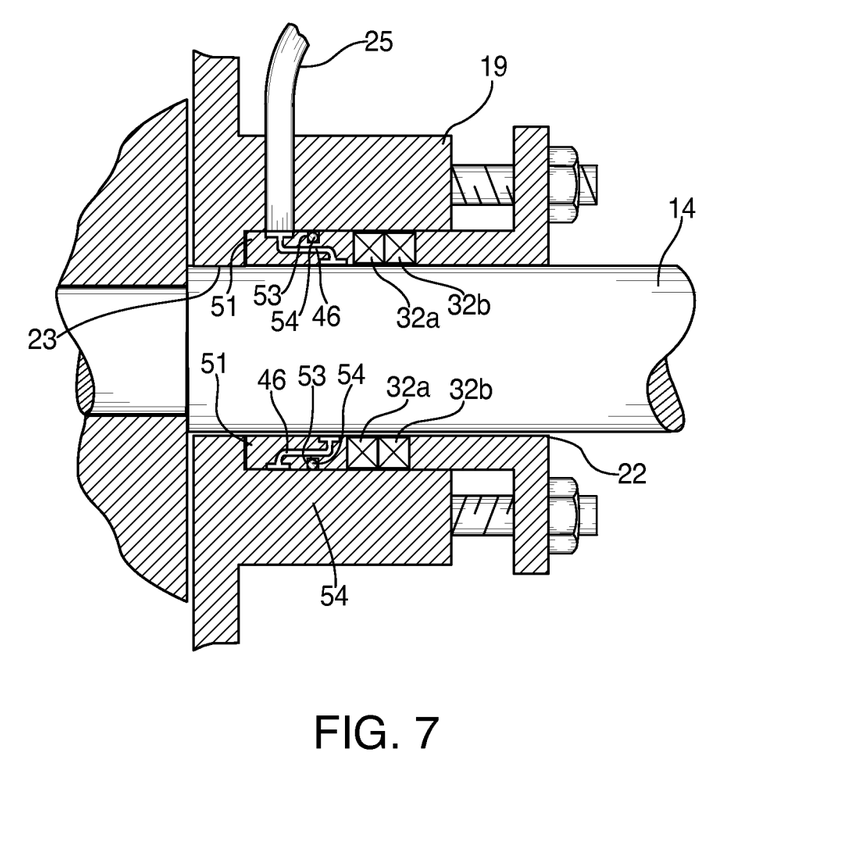
FIG. 7 is a side elevational view of an embodiment of the invention wherein the bearing of FIG. 2 includes an outer O-ring.

FIG. 7 illustrates an embodiment of the invention wherein a bearing with diverted lantern ring 51 includes an outer surface 52 with an O-ring 53 groove positioned in seal cavity 22. An O-ring 54 is positioned in O-ring groove 53 formed on outer surface 52 of bearing 51. O-ring 54 can be formed of a variety of resilient materials, including perfluoroelastomers or other resilient material compatible with the pumped fluid for providing an additional barrier to isolate the motor end of shaft 14 from fluid entering seal cavity 22. An O-ring 54 provides an additional obstacle to prevent fluid from entering seal cavity 22.

Figure 8:
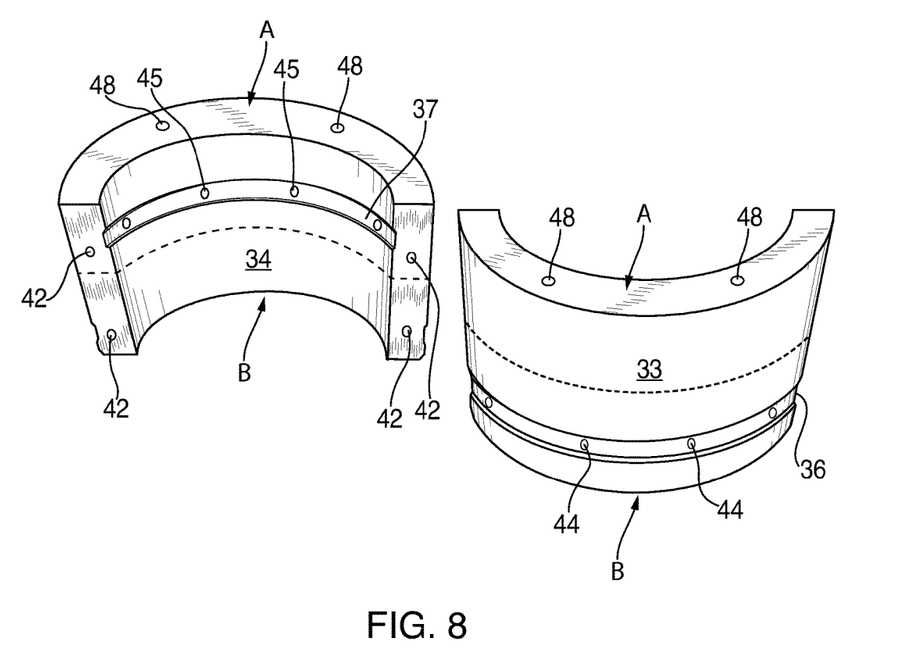
FIG. 8 is a perspective view of the two sections of the bearing of FIG. 3.

Bearing 31 or 51 is custom made for a particular shaft and pump. Cross-sectional elevational views of the mating faces of bearing 31 before reassembly are shown in FIGS. 6 and 7. FIG. 8 is a perspective of the two sections of an axially split bearing showing four extraction holes 48 at the motor end of the A section of bearing 31.

Many types of rotary equipment have the flush port close to the impeller end of the stuffing box. Almost all of these operate with heavy solids, such as mining and foods. Many pumps, such as Weir Slurry Group (Warman Pumps) pumps, GIW (Georgia Iron Works) pumps, Morris Pumps, and Krebs Pumps, and mixers (vertical and horizontal) often times have the port located there. The theory is that in order to keep slurry out of the stuffing box, the best position is at the throat. The shortcoming with this view is that flush pressure and volume are not equalized all the way around the lantern ring before it goes into the process solids. By providing a bearing with a close clearance bearing surface ahead of the exit ports of the lantern ring, the close clearance between shaft and bearing where the flush enters, forces equalization all the way around, before the flush fluid gets to the throat.

The following Example is set forth by way of illustration to help explain the invention, and is not intended to be limiting in any way.

Example I

A bearing with an integral diverted lantern ring in accordance with the invention is prepared as follows. The bearing is of a given length with an A Section that is the extraction side with an inner lantern ring groove and a B Section that is the impeller side and is chamfered with an outer lantern ring groove.

1. A piece of tube stock of a selected material is cut to a length corresponding to the total length of Sections A and B;
2. The piece is then cut into an A Section and a B Section;
3. End holes are drilled in the mating end faces of Sections A and B;
4. Pins are inserted into the holes in the mating faces to facilitate press-fit reassembly of the Sections A and B;
5. The combined Sections A and B are split in half axially.
6. The individual sections are milled, drilled and pinned and reassembled for final machining;
7. O.D and I.D. are finish turned to a specific diameter;

8. An inner groove is formed in Section A, and outer groove is formed in Section B, at predetermined locations;
9. Aligned flush holes are drilled in the O.D and I.D groove in each Section A and B to a predetermined depth;
10. Flush channels are completed by drilling into mating faces of each section to break through and connect to existing drill holes; and
11. Extraction holes are drilled into the motor end of Section A.

In this case bearing 31 of FIG. 3 has outer diameter 33 of 9.172" and inner diameter 34 of 7.140" and is 2.963" in length. The A section with inner groove 37 and extraction holes are cut to 1.482" in length. Inner groove 37 is cut 0.250" from the extraction end and 0.625" wide. The B section outer groove 36 cut 0.375" from the impeller end to match flush port 25 port the device. Flush holes 44 and 45 are ⅜" in diameter and flush channels 46 are completed by drilling into the mating faces of each section.

The dimensions set forth above are representative and not limiting of the invention. The actual dimensions of aspects of bearings to be prepared and installed according to the invention will vary according to the particular application.

Bearings 31 and 51 are substantially rigid and formed of materials which will not be attacked or destroyed by corrosive fluids being transported by pump 11. Preferred materials of construction include non-ferrous materials, molybdenum/-carbon or glass filled thermoplastic material, such as polytetrafluoroethylene (PTFE) or other suitable plastic material. Materials are selected that can provide a suitable bearing surface and are resistant to most industrial solutions. Suitable bearing materials are those that provide suitable chemical, temperature, compressive strength, flexural strength and wear characteristics and can be appropriately machined to yield the desired bearing dimensions and tolerances. Such bearing materials include, but are not limited to, polymers, including polyphenylene sulfides, polyimidizoles, polyamideimides, polybenzylimidizoles, PEEK polymers obtained by step-growth polymerization by the dialkylation of bisphenolate salts, PTFE, perfluoroalkoxy, and formulations containing these polymers in a major proportion.

Packing materials are described in the aforementioned U.S. Pat. No. 4,298,207, No. 4,371,180, No. 4,431,698, No. 4,559,862, and No. 5,370,926, the contents of each of which are incorporated herein by reference in their entirety. More particularly, useful materials include, but are not limited to, mechanically and/or thermally resilient component of graphite tape, expanded graphite foil, graphite fiber, carbon fiber, polybenzimidazole (PBI) fiber, PEK fiber, PEEK fiber, PFA fiber, aromatic polyamide fiber, Inconel or Monel wire, or combinations thereof. In another aspect of the invention, the at least one packing member is a material selected from the group consisting of carbonized yarns, graphitized yarns, exfoliated graphite yarns, ceramic yarns, and glass yarns. Tension or lip seal rings may comprise the same or different components of the same or different components. The packing rings or members may comprise mechanically and/or thermally components, whether individually or by combinations thereof, i.e., corner yarns, resilient core, etc. The designs and materials are chosen to resist packing consolidation.

Braided packing rings may include fibers of flax, jute, asbestos, or a synthetic material, such as polytetrafluoroethylene, which fibers are formed into yarns or strands and which are braided together about core strands. The result is typically a packing having a square cross-section and herringbone weave pattern extending in an axial direction along the packing Typical packing members are illustrated in U.S. Pat. No. 3,646,846, incorporated herein by reference.

In order to place bearing 31 in position in seal cavity 22, bearing 31 is preferably split along a centerline 39. Splitting bearing 31 along a diameter allows bearing 31 to be placed about installed shaft 14 and pushed into position at the impeller end of seal cavity 22. Generally, at least one or two packing rings 32a, 32b are positioned on the gland side of bearing 31.

Bearing 31 split along center line 39 includes a pair of corresponding holes 42 on both halves of split bearing 31 for receiving mounting pins 42 for realignment and reassembly of bearing 31. In this construction, pins 42 insure that when bearing 31 is secured about shaft 14, outer seal water groove 36 and inner groove 37 are properly aligned on both sections. Outer seal water groove 36 is dimensioned and positioned to align with a flush port 25 formed in housing 19.

It can readily be seen that the bearing with integral diverted lantern rings as part of a cylindrical seal and seal system constructed in accordance with the invention can be easily installed in a conventional rotary impeller pump with pins to guarantee alignment of the seal upon installation. This configuration allows seal fluid to contact the shaft closer to the motor end. Generally, two packing rings or more are added to complete installation of an effective sealing system. When in place, the bearing will support the impeller end of the pump shaft, providing an additional bearing surface to aid in eliminating the whip commonly found in pump and other rotary equipment shafts. Since the clearance between the pump shaft and the bearing is relatively small, flush fluid entering the lantern ring groove would be considerably throttled, thereby minimizing the quantity of seal water flushing and lubricating the bearing and finally entering into and diluting the product being pumped.

It will thus be seen that the object set forth above, among those made apparent from the preceding description are efficiently attained and, since certain changes may be made in the device set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, may be said to fall there between.

What is claimed is:
1. A bearing with an integral diverted lantern ring for use in an annular seal cavity of a rotary mechanical device having an output end and a power end with a shaft running through the seal cavity, comprising:
 a substantially rigid cylindrical body dimensioned to fit into the annular seal cavity of the rotary mechanical device;
 a sidewall of the bearing having an outer cylindrical surface closely dimensioned to fit into the seal cavity and having an inner bore closely dimensioned to fit over the shaft at one end of the seal cavity to provide a bearing surface for the shaft;
 the outer cylindrical surface of the bearing formed with an outer groove with at least one flush hole, and the inner bore of the bearing formed with an inner groove with at least one flush hole, the inner groove at a location spaced apart from and not aligned with the outer groove along the longitudinal axis of the bearing to form a displaced integral lantern ring;

the at least one flush hole in the outer groove extending substantially radially into the sidewall to a predetermined depth and the at least one flush hole in the inner groove extending substantially radially into the sidewall to a predetermined depth; and at least one substantially axial flush passage in the sidewall at the predetermined depths connecting the at least one flush hole in the outer groove and the at least one flush hole in the inner groove to form a non-linear path between the inner and outer grooves within the sidewall for passage of seal fluid through the bearing to the shaft.

2. The bearing of claim 1, wherein the outer groove is closer to the output end.

3. The bearing of claim 1, wherein the substantially rigid cylindrical body is split axially into two halves to facilitate installation over the shaft.

4. The bearing of claim 1, wherein the substantially rigid cylindrical body is formed of a non-ferrous metal material.

5. The bearing of claim 1, wherein the substantially rigid cylindrical body is formed from a molybdenum and carbon filled thermoplastic material.

6. The bearing of claim 1, wherein the outer groove at the output end has a width that is narrower than a length of the outer cylindrical surface at the power end.

7. The bearing of claim 1, wherein the inner groove at the power end has a width that is narrower than a length of the outer cylindrical surface at the output end.

8. The bearing of claim 3, wherein corresponding alignment holes are formed in each of the split halves, and alignment pins are positioned in the alignment holes.

9. The bearing of claim 1, wherein the outer cylindrical surface includes an O-ring groove between the outer groove and the output end, and an O-ring is disposed in the O-ring groove.

10. The bearing of claim 1, further including at least one compressible packing ring disposed on the power side of the substantially rigid cylindrical body in the seal cavity.

11. A shaft sealing system for use in an annular seal cavity of a mechanical device having an output end and a power end with a shaft running through the seal cavity, comprising:

a substantially rigid cylindrical body having a sidewall dimensioned to fit into the seal cavity about the shaft;

the sidewall of the body having an outer cylindrical surface closely dimensioned to fit into the seal cavity and having an inner bore closely dimensioned to fit over the shaft;

the outer cylindrical surface formed with an outer groove with at least one flush hole, and the inner bore formed with an inner groove with at least one flush hole, the inner groove at a location spaced apart from and not aligned with the outer groove along the longitudinal axis of the cylindrical body to form a displaced integral lantern ring;

the at least one flush hole in the outer groove extending substantially radially into the sidewall to a predetermined depth and the at least one flush hole in the inner groove extending substantially radially into the sidewall to a predetermined depth; and at least one substantially axial passage in the sidewall at the predetermined depths connecting the at least one flush hole in the outer groove and the at least one flush hole in the inner groove to form a non-linear path between the inner and outer grooves within the sidewall for passage of seal fluid through the displaced integral lantern ring and to the shaft.

12. The shaft sealing system of claim 11, wherein the substantially rigid cylindrical body is formed of a non-ferrous metal material.

13. The shaft sealing system of claim 11, wherein the outer groove at the output end has a width that is narrower than a length of the outer cylindrical surface at the power end of the annular seal cavity.

14. The shaft sealing system of claim 11, wherein the substantially rigid cylindrical body is split into two semi-circular halves along a center-line.

15. The shaft sealing system of claim 14, wherein corresponding alignment holes are formed in each semi-circular half of the substantially rigid cylinder body and alignment pins are positioned in the alignment holes.

16. The shaft sealing system of claim 11, wherein the outer surface of the substantially rigid cylindrical body includes an O-ring groove with an O-ring disposed therein.

17. The shaft sealing system of claim 11, further including at least one compressible packing ring disposed adjacent the substantially rigid cylindrical body on the power end of the annular seal cavity.

18. The shaft sealing system of claim 11, wherein the substantially rigid cylindrical body is dimensioned to provide a bearing surface for the shaft.

19. A shaft sealing system for use in an annular seal cavity of a mechanical device having an output end and a power end with a shaft running through the seal cavity, comprising:

a substantially rigid cylindrical bearing formed with a sidewall dimensioned to fit into the seal cavity;

the sidewall of the bearing having an outer cylindrical surface closely dimensioned to fit into the seal cavity and having an inner bore closely dimensioned to fit over the shaft to provide a bearing surface for the shaft;

the outer cylindrical surface formed with an outer groove with at least one flush hole and the inner bore formed with an inner groove with at least one flush hole, the inner groove at a location spaced apart from and not aligned with the outer groove along the longitudinal axis of the bearing to form a displaced integral lantern ring;

the at least one flush hole in the outer groove extending substantially radially into the sidewall to a predetermined depth and the at least one flush hole in the inner groove extending substantially radially into the sidewall a predetermined depth; and at least one substantially axial passage in the sidewall at the predetermined depths connecting the at least one flush hole in the outer groove to the at least one flush hole in the inner groove to form a non-linear path between the inner and outer grooves within the sidewall for passage of seal fluid through the displaced integral lantern ring and to the shaft.

* * * * *